United States Patent
Binkert

[11] 3,761,120
[45] Sept. 25, 1973

[54] FOOD PATTY TURNING DEVICE

[75] Inventor: Charles E. Binkert, Quincy, Ill.

[73] Assignee: A. A. Kolodziej, Quincy, Ill.; a part interest

[22] Filed: Apr. 17, 1972

[21] Appl. No.: 244,758

[52] U.S. Cl. .................................................. 294/8
[51] Int. Cl. ............................................. A47j 43/28
[58] Field of Search................. 294/11, 19 R, 28, 294/30, 34, 7, 8, 103 R, 104; 99/426, 441

[56] References Cited
UNITED STATES PATENTS

| | | | |
|---|---|---|---|
| 1,326,570 | 12/1919 | Burmeister | 294/8 |
| 2,031,183 | 2/1936 | Sonnenburg | 294/7 |
| 2,149,910 | 3/1939 | Clow | 294/104 |
| 2,642,796 | 6/1953 | LaBore | 99/441 |
| 2,643,907 | 6/1953 | Thomas | 294/7 |

Primary Examiner—Evon C. Blunk
Assistant Examiner—Johnny D. Cherry
Attorney—Harvey B. Jacobson

[57] ABSTRACT

A spatula-type instrument with the usual handle-equipped broad blade configuration for placement on a food patty supporting surface and advancement of the blade along the surface toward and beneath an associated food patty. In addition to the broad blade which may be conventionally advanced beneath an associated food patty, the device includes a downwardly swingable food patty engaging or embracing arm with a downturned free end projecting endwise outwardly beyond the free outer marginal edge of the broad blade portion of the device and the arm is swingable downwardly about, or over, a food patty adjacent to which the broad blade is placed with the arm and the free downturned end thereof overlying and embracingly engaging the upper surface of the patty as well as the side thereof remote from the broad blade portion of the device. A trigger for downwardly swinging the arm is provided adjacent the handle of the device and partial actuation of the trigger is operable to swing the arm downward into operative position engaged with an associated patty while final actuation of the trigger is operative to shift the arm and its downturned free end toward the handle of the device so as to thereby drag the food patty toward and up onto the broad blade portion of the device.

10 Claims, 7 Drawing Figures

FOOD PATTY TURNING DEVICE

The food patty turning device of the instant invention has been primarily designed to provide a foolproof manner of lifting a food patty from a cooking surface and turning the patty on the surface in a manner substantially eliminating all possibility of manipulation of the patty causing the latter to break up. In addition, the turning device ensures that a food patty may be picked up from the associated cooking surface without pushing the food patty forwardly over the cooking surface. Still further, after some experience in use of the food patty turning device the latter may be utilized to pick up a food patty from the associated cooking surface without any sliding movement between the food patty and the cooking surface.

The main object of this invention is to provide a food patty turning device that may be utilized to turn food patties in a manner substantially eliminating any possibility of the food patty being broken up during the process of lifting the patty from the associated cooking surface and turning the patty.

Another object of this invention is to provide a food patty turning device of the spatula type and including means for engaging the food patty and drawing the food patty toward and up onto the broad blade portion of the spatula type implement.

Yet another object of this invention is to provide a food patty turning device that may be utilized to turn other foods being fried in addition to food patties.

A further important object of this invention is to provide a food turning or lifting device particularly well adapted for use in lifting foods being cooked from grill-type supporting surfaces.

Still another object of this invention is to provide a food handling implement that is particularly well adapted to engage and handle cylindrical food items such as pork sausages and hot dogs, or any other food adaptable to a grill surface.

A final object of this invention to be specifically enumerated herein is to provide a food handling and turning device in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 5 is an enlarged fragmentary transverse vertical sectional view taken substantially upon the plane indicated by the section line 5—5 of FIG. 3;

FIG. 6 is a fragmentary longitudinal vertical sectional view taken substantially upon the plane indicated by the section line 6—6 of FIG. 5; and FIG. 7 is a fragmentary perspective view of an alternate form of food patty engaging arm portion which may be provided on the food turning device.

Figure 1:
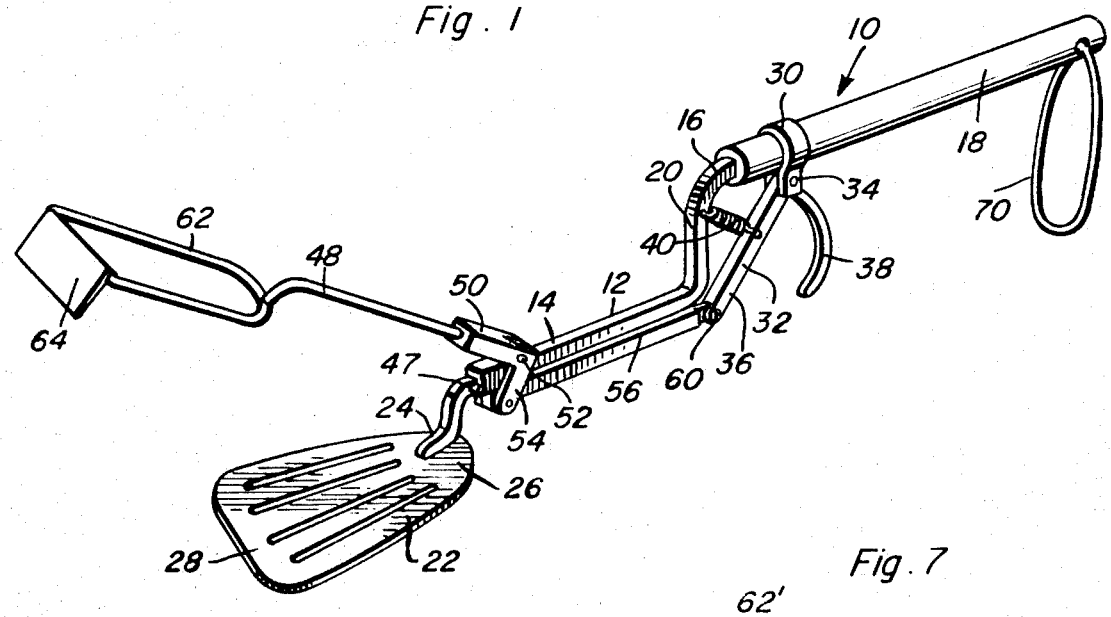
FIG. 1 is a perspective view of the food turning device of the instant invention with the swingable arm portion thereof is its elevated inoperative position.

Referring now more specifically to the drawings, the numeral 10 generally designates the food patty turning device of the instant invention. The device 10 includes an elongated metal shank 12 including a forward end portion 14 and an upwardly offset rearward end portion 16 over which an elongated longitudinally extending handle member 18 is secured. The handle member 18 may be of any suitable durable material with at least some heat insulating properties. The rear end portion 16 of the shank 12 is connected to the forward end portion 14 thereof by means of a substantially vertical connecting section or portion 20 and a broad blade 22 is provided and connected to the shank 12 by means of an offset stem 24 comprising the forward end portion of the shank 12. The stem 24 has its free end secured in an endwise outwardly opening socket (not shown) formed in the free end of the forward end portion 14 and the stem 24 is supported from the rear edge portion 26 of the broad blade 22, the latter also including a forward transverse edge portion 28.

A mounting clamp 30 is secured to the forward end of the handle 18 and oscillatably supports a bell crank 32 therefrom as at 34. The bell crank 32 defines a first actuating arm 36 and a second trigger defining arm 38 underlying the forward end of the handle 18. The bell crank 32 is oscillatable between the inoperative position thereof illustrated in FIG. 1 of the drawings and the rearwardly displaced operative position illustrated in FIG. 4 of the drawings and an expansion or tension spring 40 is connected between the actuating arm 36 and the connecting portion 20 of the shank 12 and yieldingly biases the bell crank 32 to the inoperative position thereof illustrated in FIG. 1.

The forward end portion 14 of the shank 12 has a slide collar 42 mounted thereon for sliding movement therealong and includes an upwardly projecting ear 44 apertured as at 46. A stop pin 47 is secured through the shank 12 and limits forward movement of the slide collar 42. An elongated arm 48 is provided and includes a bifurcated fitting 50 on its base end and the bifurcated fitting 50 is oscillatably supported from the mounting ear 44 by means of a pivot fastener 52 secured through the furcations of the fitting 50 and the bore or aperture 46 formed through the mounting ear 44. In addition, the furcations of the fitting 50 include depending opposite side arms 54 which extend down along and below the opposite sides of the fitting 42 and the forward end of a connecting link 56 is pivotally connected between the lower ends of the arms 54 by means of a pivot fastener 58, the rear end of the connecting link 56 being pivotally secured between the furcations of the free bifurcated end 60 of the actuating arm 36. The free end of the arm 48 includes an open frame portion 62 terminating at its outer end in a downturned flange 64.

Figure 2:
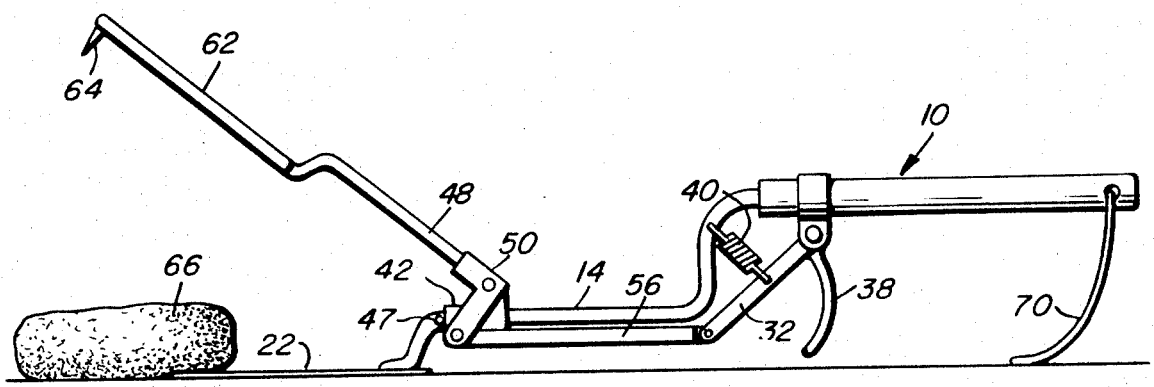
FIG. 2 is a side elevational view of the assemblage illustrated in FIG. 1 and with the turning device operatively associated with a food patty to be turned.
Figure 3:
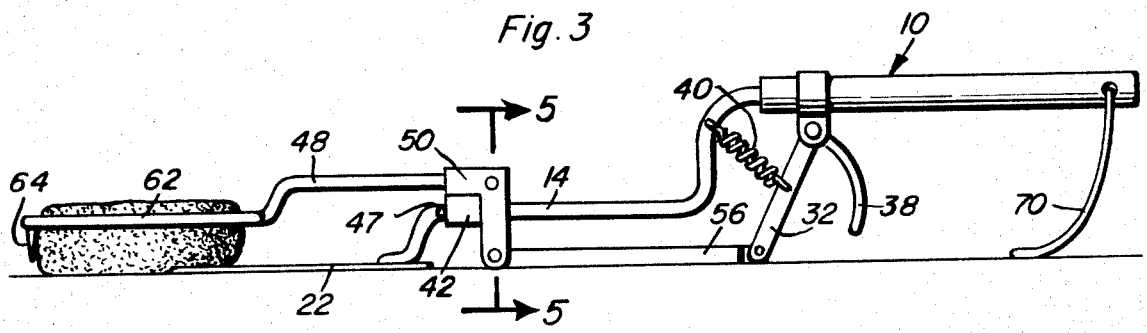
FIG. 3 is a further side elevational view of the turning device illustrating the manner in which the swingable arm portion thereof may be lowered down into engagement with a food patty to be drawn onto the broad blade portion of the device.

It may be seen from FIGS. 2 and 3 of the drawings that the broad blade 22 may be positioned adjacent a food patty 66 and that the trigger 38 may then be actuated to be swung rearwardly from the position thereof illustrated in FIG. 2 of the drawings to the position thereof illustrated in FIG. 3 of the drawings in order to cause the arm 48 and the open frame portion 62 to swing downwardly with the latter embracing the patty 66 and the flange 64 disposed on the remote side of the patty 66 from the broad blade 22. Then, further actuation of the trigger 38 to swing the latter rearwardly to the position thereof illustrated in FIG. 4 of the drawings will cause the slide 42 and the fitting 50 to slide rearwardly along the forward end portion 14 of the shank 12 in order to draw the food patty up onto the broad blade 22. With the patty 66 thus held captive within the frame 62, the patty 66 may be turned by lifting and rotating the device 10 approximately 180° about the longitudinal axis of the handle 18, whereupon the patty will be turned and allowed to fall back toward the grill surface from which the patty was lifted.

Figure 4:
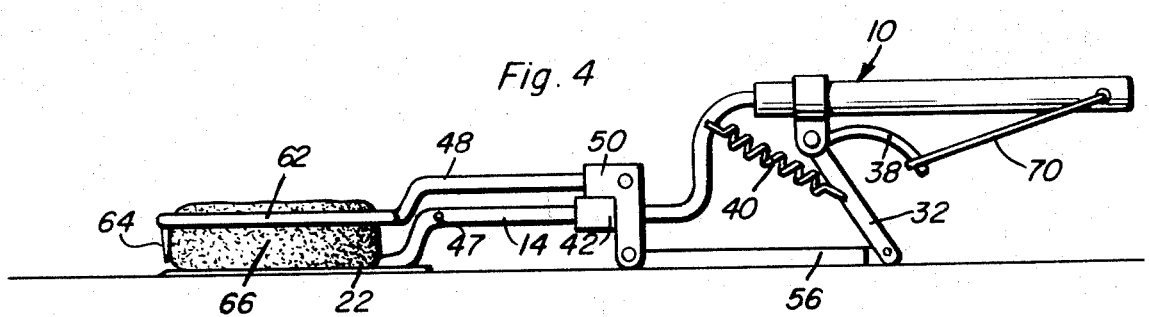
FIG. 4 is still another side elevational view of the food turning device with the swingable arm engaging portion thereof slid rearwardly to draw the associated food patty fully onto the broad blade portion of the device.

If it is desired, the bell crank 32 may be retained in the position thereof illustrated in FIG. 4 of the drawings by engaging the flexible loop 70 anchored to the rear end of the handle 18 with the free end of the trigger 38. Further, it will be appreciated that the device 10 may also be utilized to advantage in handling cylindrical food materials such as sausages and hot dogs. Also, downward swinging movement of the arm 48 as a result of counterclockwise swinging movement of the bell crank as illustrated in FIGS. 2 through 4 of the drawings continues until the fitting 50 abuts the upper surface of the slide 42 disposed forward of the mounting ear 44. Thereafter, with further downward swinging of the arm 48 prevented, additional counterclockwise swinging of the spring actuated bell crank 32 will cause the fitting 50, the slide 42 and the arm 48 to move rearwardly toward the handle 18.

After a person has had an opportunity to use the device several times it will be very easy for that person to lift a food patty from a supporting surface without causing any sliding movement of the food patty relative to the supporting surface. This is accomplished by shifting the device 10 in the direction of the food patty after the latter has been engaged with the device 10 in the manner illustrated in FIG. 3 of the drawings as the bell crank 32 is swung from the FIG. 3 position thereof to the FIG. 4 position thereof.

With attention now invited more specifically to FIG. 7 of the drawings, there may be seen a modified form of swing arm 48' having a broad blade 62' on its free end adjacent the flange 64' corresponding to the flange 64. The arm 48' corresponds to the arm 48, but the broad blade 62' is not downwardly offset as is the frame 62. In this manner, when the arm 48' is used and swung to a position corresponding to the position of the arm 48 in FIG. 4 of the drawings, the food patty 66 is clamped between the blade 22 and the blade 62'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated generally horizontal shank defining a handle on one end and a flat blade on the other end disposed in a generally horizontal plane paralleling said shank, an elongated arm, means pivotally supporting one end of said arm from said shank for limited oscillation relative thereto about an axis extending transversely of said arm and shank and generally paralleling said plane, the other end of said arm including food patty restraining means, said arm being disposed above said shank and swingable between an operative limit position with the free end of said arm closely overlying said blade and a nonoperative limit position with the free end of said arm swung upwardly away from said blade, said restraining means, when said arm is swung downwardly to its operative limit position, being adapted to restrain a food patty disposed on said blade against movement relative to the latter in at least one plane, said means pivotally supporting said one end of said arm from said shank including a slide slidable along said shank and from which said arm is pivotally supported, said slide being shiftable toward said handle to a limit position thereof with the free end portion of said arm overlying said blade when said arm is in its operative position and a limit position shifted away from said handle and toward said blade with the free end of said arm projecting endwise outwardly beyond the free end of said blade.

2. The combination of claim 1 wherein the free end of said arm includes downwardly projecting abutment means for engaging the side of a food patty remote from the handle when said blade is engaged with the food patty.

3. The combination of claim 2 including means connected between said handle and said slide for displacing the latter toward its limit position adjacent said handle.

4. The combination of claim 4 wherein said means connected between said handle and said slide also includes means for swinging said arm between its limit positions.

5. The combination of claim 1 wherein the end portion of said shank defining said handle is laterally offset from the remote end portion of said shank from which said blade is supported.

6. The combination of claim 5 wherein the free end of said arm includes downwardly projecting abutment means for engaging the side of a food patty remote from the handle when said blade is engaged with the food patty.

7. The combination of claim 6 including means connected between said handle and said slide for displacing the latter toward its limit position adjacent said handle.

8. The combination of claim 7 wherein said means connected between said handle and said slide also includes means for swinging said arm between its limit positions.

9. The combination of claim 1 wherein said restraining means comprises an open frame disposed in a plane generally paralleling said axis and said flat blade when said arm is in said operative position with said frame disposed to loosely embrace a food patty resting on said flat blade.

10. In combination, an elongated shank defining a handle on one end and food support means on the other end, an elongated arm, mounting means supporting one end of said arm on said shank adjacent said food support means for oscillation of said arm about an axis transverse to said shank and arm and swinging movement of the other end of said arm toward and away from an active position closely adjacent one side of said food support means in position for clamping a food patty between said food support means and said other end of said arm, said mounting means including pivot axis defining means supported from said arm for shifting thereon between first and second longitudinally spaced positions shifted toward said food support means and said handle, respectively, said arm including a laterally directed portion on said other end thereof projecting toward said food support means, said laterally directed portion being disposed endwise outwardly of said food support means when said arm is swung toward said active position and said pivot axis defining means is shifted along said shank to said first position, whereby subsequent shifting of said arm along said shank toward said handle may be effective to engage said laterally directed portion with a food patty and slide said food patty onto said support means.

* * * * *